March 29, 1960 W. M. LAIRD ET AL 2,930,967
METHOD AND APPARATUS FOR LOGGING DRILLING FLUID
Filed Dec. 29, 1953 2 Sheets-Sheet 2

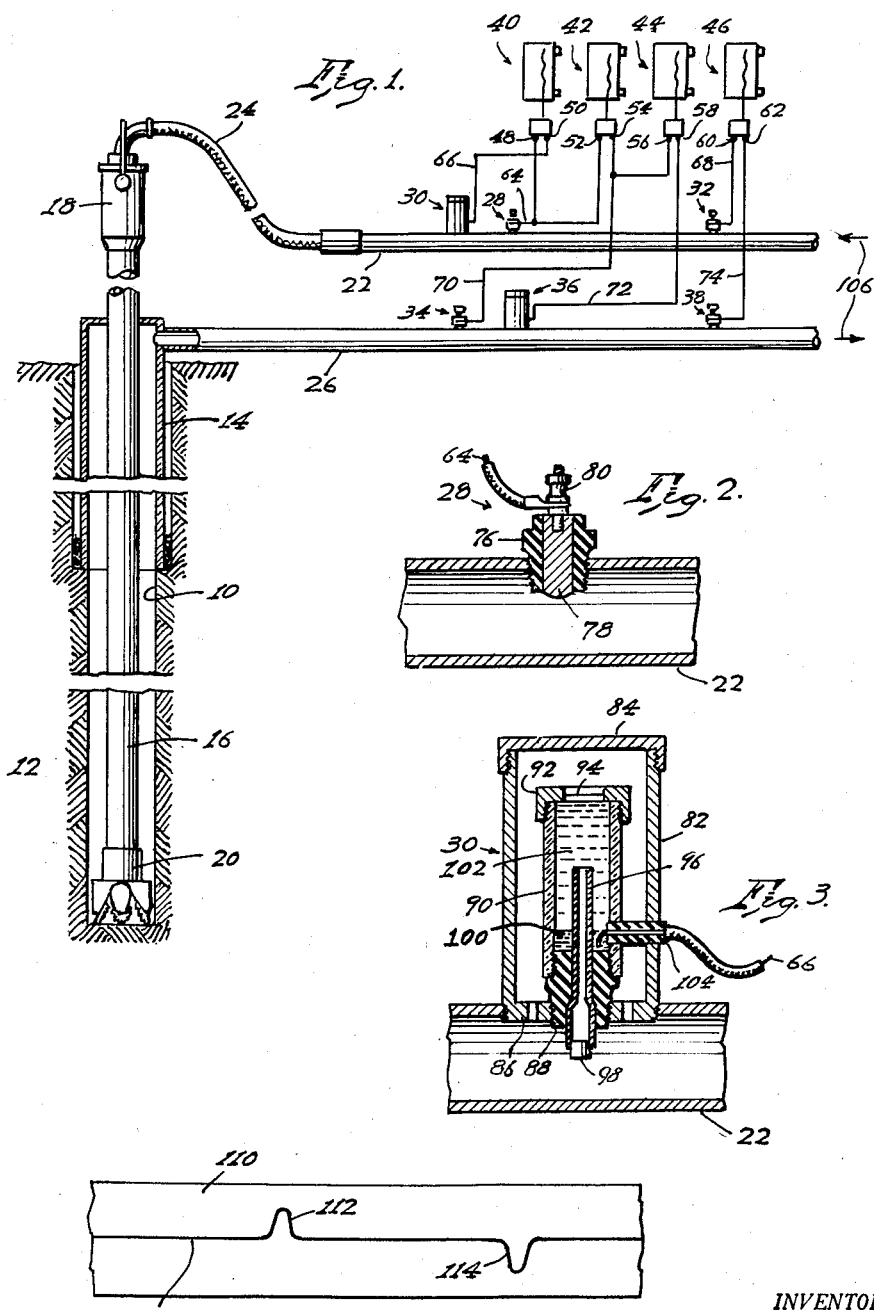

INVENTORS.
William M. Laird and
BY Malcolm R.J. Wyllie.

Horace Bleoke
ATTORNEY:

United States Patent Office 2,930,967
Patented Mar. 29, 1960

2,930,967

METHOD AND APPARATUS FOR LOGGING DRILLING FLUID

William M. Laird, Pittsburgh, and Malcolm R. J. Wyllie, Indiana Township, Allegheny County, Pa., assignors to Gulf Research & Development Company, Pittsburgh, Pa., a corporation of Delaware Application December 29, 1953, Serial No. 401,030

18 Claims. (Cl. 324—1)

This invention relates to the drilling of wells wherein drilling fluid is circulated to the bit through the drill stem to return to the earth's surface in the annular space surrounding the drill stem, and pertains more particularly to a method of and apparatus for sensing the separate concentrations or the concentration differential between the drilling fluid introduced into the drill stem and that returning to the earth's surface with respect to a particular ion or class of ions.

During rotary drilling operations, drilling fluid is circulated downwardly through the drill stem and out of the bit into intimate contact with the particular formation being penetrated by the bit whereupon the drilling fluid then returns to the earth's surface in the annular space surrounding the drill stem carrying along therewith and being in intimate contact therewith the cuttings and particles then being removed by the bit.

By virtue of such contact of the drilling fluid with formation materials, the drilling fluid during a single round trip to the bottom of the bore-hole becomes modified by dissolving such components of the contacted formation materials as are soluble in the drilling fluid, with the amount of solute thus taken up and its character being determined by the properties of the particular drilling fluid and the character of the formation materials contacted. Subject to an important exception to be noted later, filter cake and well casing substantially sheath the borehole walls against being contacted by drilling fluid returning to the earth's surface, other than in the immediate vicinity of the bit; and therefore, any particular increment of drilling fluid is modified by dissolving action only to a substantial extent by the formations being drilled at the time the increment of drilling fluid emerges from the bit.

The important exception mentioned above occurs when the borehole passes through an impervious formation containing substances soluble in the drilling fluid, under which circumstances no sheathing filter cake is built up on such impervious formations, and the drilling fluid is modified by taking up such soluble substances as solute.

The character of a drilling fluid may also be subject to modification during drilling by formation fluids entering the borehole and commingling with the drilling fluid.

Broadly, the present invention is concerned with detecting changes in the character of the drilling fluid and comprises a method of and apparatus for sensing the concentration of a particular substance in the drilling fluid before the drilling fluid is discharged from the bit and after the drilling fluid returns to the earth's surface and recording such data against time, or, alternatively sensing the concentration differential of a particular substance in the drilling fluid before it is discharged from the bit and after the same returns to the earth's surface and recording such data against time. The invention also comprises a method of and apparatus for determining the time interval required for an increment of drilling fluid to circulate into and out of a borehole.

More specifically, the present invention involves sensing the concentration of a selected ion or class of ions in the drilling fluid by electrochemical means, with an appropriately selected electrode that will produce an electromotive force that is related to the concentration or activity of the selected ion or class of ions being disposed in the drilling fluid passing into the drill stem. A corresponding electrode is also positioned in the stream of drilling fluid returning to the earth's surface. The differential between the electromotive forces produced by the electrodes can be recorded, or such electromotive forces can be individually measured against appropriate reference electrodes and recorded. There is no limit as to the number of different ions that may be so detected concurrently, it being only necessary that for each particular ion to be logged electrodes reversible with respect to such particular ion be utilized in the drilling fluid stream entering and leaving the borehole.

The method of the invention and the value of the information that can be obtained thereby will be best understood in the light of the accompanying drawings of a preferred embodiment of the invention, wherein;

Figure 1 is a schematic representation of the sensing and recording apparatus of the invention and illustrates the operative relation of such apparatus to the drilling fluid circulatory system of a well being drilled;

Figure 2 is an enlarged sectional detail view of a drilling fluid conduit having disposed therein an electrode that is reversible with respect to a particular ion;

Figure 3 is an enlarged sectional detail view of a drilling fluid conduit having disposed therein a reference electrode;

Figure 4 is a fragmentary view of a portion of idealized recorded data obtained by use of the apparatus of Figure 1;

Figure 5:
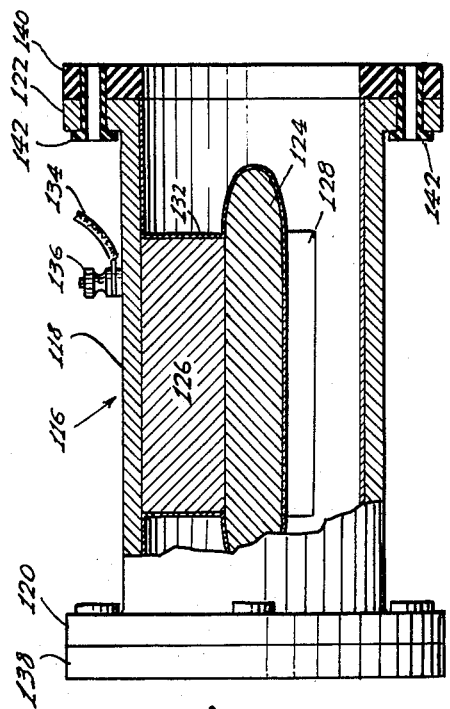
Figure 5 is an elevational view, partly in central vertical section, of a modified form of the electrode shown in Figure 2.

Referring to the drawings, wherein like numerals designate similar parts throughout the various views, the numeral 10 designates a borehole in earth formations 12.

The upper portion of the borehole 10 is cased with conventional surface casing 14, with conventional rotatable hollow drill stem 16 supported by a combined swivel and fluid coupling 18 and carrying a bit 20 at its lower end extending downwardly through the casing 14 to the bottom of the borehole 10.

As in the usual rotary drilling installation, means is provided for circulating drilling fluid which includes a drilling fluid pipe 22, flexible hose 24, and the combined swivel and fluid coupling 18 for circulating drilling fluid from a suction pit, not shown, into the upper end of the rotary drill stem 16. Such means also includes the upper end of the surface casing 14 being provided with an outlet pipe 26 for directing drilling fluid returning to the earth's surface into a settling pit, not shown.

The structure thus far described is entirely conventional, and it will be understood by those skilled in the art that suitable pumping means, not shown, are provided in conjunction with the described apparatus for causing drilling fluid to follow a course that includes passing through the pipe 22, into the flexible hose 24, thence through the combined swivel and fluid coupling 18 and downwardly through the drill stem 16 to be discharged from the bit 20, whereupon the drilling fluid thence passes upwardly through the borehole 10 in the annular space surrounding the drill stem 16 to be discharged outwardly from the surface casing 14 through the outlet pipe 26. It is to the thus far described conventional assemblage of apparatus that the sensing and recording means hereinafter described are applied.

The pipes 22 and 26 are provided with identical sets of electrodes or electrochemical cells namely 28, 30 and 32, and 34, 36 and 38, respectively. The structure and function of such electrodes will subsequently be described in considerable detail but for the moment it will suffice to state that the identical electrodes 28 and 34 will each electrochemically produce an electromotive force of a magnitude dependent upon the concentration, or more accurately the activity of a particular ion or class of ions in the pipe associated therewith. The same is true of the identical electrodes 32 and 38, although it should be noted at this time that such electrodes are responsive to ions of a sort differing from those to which the electrodes 28 and 34 are responsive. The identical electrodes 30 and 36 are reference electrodes of any suitable character, preferably of the saturated calomel electrode type utilizing saturated KCl as an electrical bridge.

Four clock-driven potentiometric recorders of conventional type 40, 42, 44, and 46 are provided, each having the usual input terminals 48 and 50, 52 and 54, 56 and 58, and 60 and 62, respectively.

The above-described electrodes and their association with the recorders is now set forth. The electrode 28 is provided with an electric conductor 64 which is branched and connected to the terminals 48 and 52 of the recorders 40 and 42, respectively. The electrode 30 is provided with an electrical conductor 66 that is in turn connected to the terminal 50 of the recorder 40. The electrode 32 is provided with an electrical conductor 68 that is in turn connected to the terminal 60 of the recorder 46. The electrode 34 is provided with an electrical conductor 70, which is branched and connected to the terminals 54 and 56 of the recorders 42 and 44, respectively. The electrode 36 is provided with an electrical conductor 72 that is connected to the terminal 58 of the recorder 44. The electrode 38 is provided with an electrical conductor 74 that is connected to the terminal 62 of the recorder 46.

The above-described association of the electrodes and the recorders is such that the recorder 40 will record potential differences between the electrodes 28 and 30 and thereby furnish a time record of the absolute activity of the selected ion or class of ions passing through the pipe 22; while the recorder 44 by virtue of its association with the electrodes 34 and 36 will furnish a corresponding time record with respect to the pipe 26. The recorder 42 by virtue of its association with the electrodes 28 and 34 will furnish a time record of a function dependent upon a differential between the activities of the selected ion or class of ions in the pipes 22 and 26. The recorder 46 provides a record similar to that furnished by the recorder 42; however such a record is with respect to another type or class of ions.

Before proceeding with a more detailed discussion of the function of the apparatus shown in Figure 1 the structure of the electrodes used therein will be first described. Inasmuch as the electrodes 28 and 34 are identical a detailed description of one of such electrodes will suffice for both and, accordingly, attention is directed to Figure 2 wherein the electrode 28 is shown in section.

The electrode 28 comprises an electrically nonconductive sheath or hollow body 76 that is externally threaded and screwed into the pipe 22. The sheath 76 can conveniently be fashioned of a suitable plastic material and receives therein the active component 78 of the electrode 28. The active component 78 is snugly received within the sheath 76 and projects slightly from the end of the sheath 76 that is disposed within the pipe 22, the arrangement being such that the flow of fluids through the pipe 22 tend to scour the component 78 and permit the latter to continuously contact fresh increments of the flowing fluid stream.

The active component 78 of the electrode 76 is so selected as to be electrochemically reversible with respect to the particular ion or class of ions that are to be sensed. For example, one of the most important uses of the invention involves sensing the activities of chloride ions, and for selectively sensing the activities of such chloride ions, the active component 78 of the electrode 28 can conveniently be a silver-silver chloride combination. Electrode components comprised of a combination of silver and silver chloride are known to the prior art, and usually comprise metallic silver partially coated with silver chloride. Accordingly, the component 78 of the electrode 28 may be metallic silver with the end thereof within the pipe 22 being partially coated with silver chloride. The component 78 is combined with a binding post 80 to which the electrical conductor 64 is attached.

In the event that it is desired that the electrode 28 be reversible with respect to iodide or bromide ions for example, the component 78 can be silver as described above, however, the inner exposed end thereof would be coated with the silver salt of the particular halide concerned.

Actually, the electrode 28 is subject to numerous other modifications, and can, for example, be made reversible with respect to sulfate ions by making the main body of the component 78 of lead with the inner exposed end thereof being at least partially coated with lead sulfate. In the event it is desired to sense the total activities of say all cations present in the drilling fluid passing through the pipe 22, the component 78 of the electrode 28 can be constituted in the form of the electrodes disclosed in U.S. Patent No. 2,614,976 issued October 21, 1952, to Patnode et al. For example, the particular form of electrode disclosed in Figure 1 of said patent can be especially adapted for placement within the sheath 76 to constitute the component 78 of the electrode 28. Conversely, in the event it is desired to sense the total activities of all anions present in the drilling fluid, the component 78 can be constituted in a similar fashion in which an anion exchange material is employed.

As mentioned previously, irrespective of the particular selected type of electrode 28 employed, the electrodes 28 and 34 are to be identical, and are preferably disposed in their respective pipes 22 and 26 upstream of the associated reference electrodes 30 and 36. The electrodes 32 and 38 are also identical, and while specifically differing from the selected form of electrodes 28 and 34, they are of the same type as the described electrode 28. In other words, the electrodes 28 and 34 may be so selected as to be reversible with respect to chloride ions, while the electrodes 32 and 38 are made reversible with respect to sulfate ions.

Inasmuch as the electrodes 30 and 36 are identical, a detailed description of the electrode 30 should suffice for both and, accordingly, attention is now directed to Figure 3 wherein there is illustrated a sectional view of the electrode 30.

The reference electrode 30 is basically a saturated calomel electrode especially adapted for use in a high pressure environment. The same will be seen to comprise a vertical, hollow cylindrical shell 82 externally threaded at its opposite ends, such shell 82 being provided with a cap 84 threaded onto its upper end, and being threaded into the pipe 22 at its lower end, as shown.

The shell 82 is provided with a perforated, inturned flange 86 at its lower end, whereby fluid pressures within the pipe 22 are communicated to the interior of the shell 82. An electrically nonconductive plug 88, formed of a material similar to that of the sheath 76, is threaded through the flange 86. A tube 90 is threaded on the upper end of the plug 88, such tube 90 extending above the plug 88 and being preferably formed of a transparent, electrically nonconductive plastic material. The upper end of the tube 90 is closed by a cap 92 threaded thereon, such cap 92 being distinguished by having a thin, flexible, central portion 94 in the nature of a diaphragm.

A vertical central tube 96, preferably made of glass, extends through the plug 88 to a position adjacent the center of the pipe 22. The lower end of the tube 96 is substantially closed by a slightly pervious plug 98, such as porcelain or the like. As shown, the plug 98 is disposed at such a position within the pipe 22 that fluids flowing therethrough will continuously tend to scour the same of deposits and permit the plug 98 to be continuously contacted by fresh increments of fluid.

A paste 100 of mercury and mercurous chloride is disposed above the plug 88 in the annular space surrounding the tube 96, with the remaining volume within the tubes 90 and 96 being substantially filled with a saturated solution of potassium chloride in water 102. An insulating grommet 104 extends through alinged openings in the shell 82 and the tube 90, with the electrical conductor 66 extending through the grommet 104 into contact with the paste 100. The portion of the electrical conductor 66 that is in contact with the paste 100 is preferably formed of platinum or one of the other noble metals.

During operation, it will be seen that the structure of the reference electrode 30 is such that the fluid pressure within the pipe 22 is communicated through the diaphragm 94 to the contents of the tube 90, whereby fluid pressure differential across the plug 98 is essentially avoided. Since gases will in all probability be trapped within the shell 82, any pressure differential existing across the plug 98 will in all probability be such that very minute quantities of the potassium chloride solution will pass outwardly from the tube 96 into the pipe 22.

From the foregoing, it is believed that the operation of the apparatus and the value of the information obtained thereby will be readily understood. Exemplary of the manner in which the apparatus can be operated is the situation when the electrodes 28 and 34 are of the type reversible with respect to the chloride ion, while the electrodes 32 and 38 are of a type reversible with respect to the sulfate ion. During circulation of the drilling fluid in the direction indicated by the arrows 106, the recorder 40 records data directly correlative to the absolute concentration, or more accurately absolute activity of the chloride ion present in the drilling fluid passing through the pipe 22; while the recorder 44 makes a similar record with respect to the drilling fluid passing through the pipe 26. The recorder 42 records continuously values directly correlative to the difference in concentration, or more accurately the activities of the chloride ions present in the drilling fluid in the pipes 22 and 26. The recorder 46 under the operating conditions described above will provide data similar to that recorded by the recorder 42, however with respect to the sulfate ion.

Under such operating conditions, it is to be noted that in the event the bit 20 penetrates into a salt dome, the drilling fluid would immediately begin to take up sodium chloride as a solute. As soon as drilling fluid enriched with sodium chloride reaches the electrode 34, the electromotive force produced by such electrode is affected by virtue of the increased activity of chloride ion, whereupon the recorder 42 records the extent of such increased activity as compared to the activity of chloride ion in the drilling fluid being introduced into the borehole. Such information is immediately available to operating personnel, and for subsequent study by others. The data provided by the recorders 40 and 44 can also be of great value in interpreting the occurrence of subterranean events or conditions. The data provided by the recorder 46 may be of great value in interpreting the data provided by the recorders 40 and 44, inasmuch as the recorder 46 may be operated in such a manner as to make easily ascertainable the time interval that elapses between the passage of a particular increment of drilling fluid from the pipe 22 to the pipe 26. Ascertainment of such time interval is of manifest value in correlating the records produced by the recorders 40 and 44, inasmuch as such records may be considered in relation to single increments of drilling fluid.

In order to obtain knowledge as to the above-mentioned time interval through the use of the recorder 46, it is only necessary to introduce an ionizable salt productive of ions with respect to which the electrodes 32 and 38 are reversible into and increment of the drilling fluid stream as it enters the pipe 22. Referring to Figure 4, it will be seen that recorder 46 makes a line 108 on a chart 110 indicative of the differential concentrations in the pipes 22 and 26 with respect to the sulfate ion. As the increment of drilling fluid enriched with sulfate ions (say by having had added thereto a portion of sodium sulfate) passes the electrode 32, a differential electromotive force is established between the electrodes 32 and 38 in one sense so that a pip 112 is formed in the line 108; however, when such sulfate ion enriched increment of drilling fluid reaches the electrode 38 it will cause a differential electromotive force in the opposite sense to cause a pip 114 in the line 108. The pips 112 and 114 will be in opposite directions thus making their identification very simple and the distance between the pips is a measure of the interval of time that elapses between such increment of drilling fluid passing the electrodes 32 and 38. Such distance may be easily correlated with the speed of advance of the chart 110 as the line 108 is drawn to obtain the time interval.

In connection with the chart 110, it is also to be expressly noted that a greater activity of the selected ion in the vicinity of the electrode 32 than in the vicinity of the electrode 38 results in a pip in one direction, while a reversal of such activities in the vicinity of the electrodes 32 and 38 results in a pip in the opposite direction. Thus, if during observation of the recorder 46 a sudden change in the record is noted, such change in the record can ordinarily be attributed immediately to either a change in the activity of the selected ion occurring within the borehole 10 or a change in the activity of the selected ion occurring outside the borehole 10, depending on the direction of the change in the record. For example, in chart 110, the curve in the line 108 defining the beginning of the pip 112 could be attributed to a change in the drilling fluid occurring outside of borehole 10, say in the mud pit. On the other hand, the curve in the line 108 defining the beginning of the pip 114 can, neglecting the special circumstances causing the same, be attributed to a change in the drilling fluid occurring in the borehole 10. Of course the pip 114 actually resulted from changing the drilling fluid outside the borehole 10; however, no interpretive confusion will occur in such a special case as such a result is expected.

The comments of the above paragraph also apply to the record produced by the recorder 42. For example, assuming the electrodes 28 and 34 are reversible with respect to chloride ions, a sudden change of record in one direction would immediately indicate a change in the drilling fluid occurring within the borehole 10 rather than outside thereof, such as formation salt water intrusion into the borehole 10 or the bit 20 penetrating a salt dome.

Figure 6:
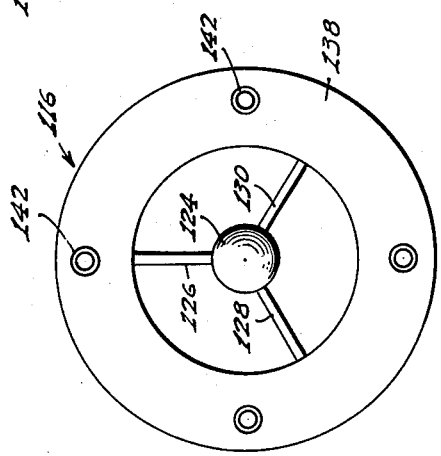
Figure 6 is an end view of the structure shown in Figure 5.

Attention is now directed to Figures 5 and 6, wherein there is shown an alternative form of the electrodes 28, 32, 34, and 38. Such modified form of electrode is particularly adapted for a large area of intimate contact with flowing fluids. The modified form of electrode designated by the numeral 116 comprises a tubular casing 118 provided with securing flanges 120 and 122 at its opposite ends.

An elongated, streamlined, cigar-shaped body 124 is concentrically disposed within the casing 118. The body 124 is substantially smaller than the casing 118 and is retained in position by a plurality of radially extending, supporting vanes 126, 128, and 130, each of which is suitably secured to the body 124 and the casing 118. Considered together, the body 124, and the vanes 126, 128, and 130 constitute means within the casing presenting a large surface area.

The entire exposed surface of the body 124, the vanes 126, 128, and 130, and the interior of the casing 118 is coated with an active electrode material 132, such as silver or lead, that corresponds generally to the component 78 of the previously described electrode 28. The exposed surface of the material 132 is in turn partially coated, not shown, in the same manner as the component 78 of the electrode 28. For example, where the material 132 is silver, the same can be partially coated with silver chloride to make the electrode 116 reversible with respect to chloride ions; and where the material 132 is lead, the same can be partially coated with lead sulfate to make the electrode 116 reversible with respect to sulfate ions.

The casing 118, the body 124, and the vanes 126, 128, and 130 are preferably metallic to lend structural strength to the electrode 116 and are preferably in electrical contact with the material 132, whereby the electromotive force produced by the electrode 116 is conducted to an electrical lead 134 that is secured to the casing 118 by a binding post 136.

The material 132 can be coated on the casing 118, the body 124, and the vanes 126, 128 and 130 in any suitable manner, such as by electrodeposition, by dipping in molten material 132, flame spraying, etc.

The electrode 116 not only affords a large area of intimate contact with fluids, while affording little resistance to fluid flow, but also serves as a conduit for such fluids; the electrode 116 being provided with means for interposing the same in a fluid conduit while not being in electrical contact therewith. Such means comprise electrically nonconductive gaskets 138 and 140 positioned against the flanges 120 and 122, respectively, with electrically nonconductive bushings 142 extending through aligned openings in each flange and its respective gasket. The arrangement is such that the electrode 116 can be interposed in a conduit and secured to flanges, not shown, on adjacent ends thereof by nuts and bolts, not shown. It will be evident that in such a manner, electrodes like the electrode 116 can be interposed in the pipes 22 and 26 and substituted for the electrodes 28, 32, 34, and 38. For use in the pipes 22 and 26, it is preferred that the overall length of the electrode 116 be about one foot or more in length in order to afford a large area of intimate contact with the drilling fluids flowing therethrough.

The invention is of course subject to numerous modifications without departing from the spirit thereof. For example, while the potentiometric recorders have been described as being clock-driven, they can be arranged so that the charts are driven at a rate that is a function of the rate of bit penetration, so that resulting records are a function of the depth being drilled. Additional potentiometric recorders can be usefully employed, such as by placing a potentiometric recorder in parallel with each of the recorders 42 and 46, where such additional recorders are driven at a rate that is a function of the rate of bit penetration.

From the above description, the advantages stemming from being able to ascertain accurately and speedily any changes in the character of drilling fluid with respect to selected ion or ions will be appreciated. The above-described method and apparatus can be conveniently employed for logging formations drilled; and for promptly detecting salt domes, formation fluid intrusion into the borehole, and other similar subterranean events or conditions that modify the drilling fluid.

It is believed that no further description of the invention is necessary for a full and complete understanding thereof by those skilled in the art, it being evident that the same readily lends itself to numerous variations, principally with respect to the structural details of the electrodes and the particular ion with respect to which they are reversible. The actual scope of the invention should be ascertained upon reference to the appended claims.

We claim:

1. In the process of well drilling wherein a first stream of drilling fluid is circulated to the bottom of a borehole with such drilling fluid then returning to the earth's surface as a second stream of drilling fluid; the improvement comprising electrochemically producing a first electromotive force of a magnitude dependent upon the activity of a selected ion in the first stream, electrochemically producing a second electromotive force of a magnitude dependent upon the activity of the selected ion in the second stream, and correlating the electromotive forces produced.

2. In the process of well drilling wherein a first stream of drilling fluid is circulated to the bottom of a borehole with such drilling fluid then returning to the earth's surface as a second stream of drilling fluid; the improvement comprising electrochemically producing a first electromotive force of a magnitude dependent upon the total of the activities of all cations in the first stream, electrochemically producing a second electromotive force of a magnitude dependent upon the total of the activities of all cations in the second stream, and correlating the electromotive forces produced.

3. In the process of well drilling wherein a first stream of drilling fluid is circulated to the bottom of a borehole with such drilling fluid then returning to the earth's surface as a second stream of drilling fluid; the improvement comprising electrochemically producing a first electromotive force of a magnitude dependent upon the total of the activities of all anions in the first stream, electrochemically producing a second electromotive force of a magnitude dependent upon the total of the activities of all anions in the second stream, and correlating the electromotive forces produced.

4. In the process of well drilling wherein a first stream of drilling fluid is circulated to the bottom of a borehole with such drilling fluid then returning to the earth's surface as a second stream of drilling fluid; the improvement of electrochemically producing a first electromotive force of a magnitude dependent upon the activity of a selected ion in the first stream, electrochemically producing a second electromotive force of a magnitude dependent upon the activity of the selected ion in the second stream, and producing a third electromotive force having a magnitude that is a function of the magnitudes of the first and second electromotive forces.

5. In the process of well drilling wherein a first stream of drilling fluid is circulated to the bottom of a borehole with such drilling fluid then returning to the earth's surface as a second stream of drilling fluid; the improvement comprising electrochemically producing a first electromotive force of a magnitude dependent upon the activity of a selected cation in the first stream, electrochemically producing a second electromotive force of a magnitude dependent upon the activity of said selected cation in the second stream, and correlating the elecrtomotive forces produced.

6. In the process of well drilling wherein a first stream of drilling fluid is circulated to the bottom of a borehole with such drilling fluid then returning to the earth's surface as a second stream of drilling fluid; the improvement comprising electrochemically producing an electromotive force of a magnitude dependent upon the activity of an ion in the first stream, such ion being selected from the group consisting of chloride, iodide, bromide, and sulfate ions, electrochemically producing a second electromotive force of a magnitude dependent upon the activity of such selected ion in the second stream, and correlating the electromotive forces produced.

7. In the process of well drilling wherein a first stream of drilling fluid is circulated to the bottom of a borehole with such drilling fluid returning to the earth's surface as a second stream of drilling fluid; the improvement comprising electrochemically producing a first electromotive force of a magnitude dependent upon the activity of the chloride ion in the first stream, electrochemically producing a second electromotive force of a magnitude dependent upon the activity of the chloride ion in the second stream, and correlating the electromotive forces produced.

8. The process of claim 1, including producing a third electromotive force of a magnitude dependent upon the differential between the first and the second electromotive forces, and recording the third electromotive force.

9. The process of claim 8, and also recording the first and second electromotive forces.

10. The process of claim 8, including increasing the concentration of the selected ion in an increment of the first stream of drilling fluid.

11. The process of claim 10, including measuring the time interval between fluctuations of the third electromotive force in opposite directions.

12. The process of claim 7, including producing a third electromotive force of a magnitude dependent upon the differential between the first and the second electromotive forces, and recording the third electromotive force.

13. The process of claim 12, and also recording the first and second electromotive forces.

14. In well drilling apparatus of the type that includes conduit means for circulating drilling fluid to the bottom of a bore hole, and additional conduit means for drilling fluid returning to the earth's surface; the improvement comprising a first means associated with the first-mentioned conduit means for electrochemically producing a first electromotive force of a magnitude dependent upon the activity of a selected ion in drilling fluid passing therethrough, a second means associated with the additional conduit means for electrochemically producing a second electromotive force of a magnitude dependent upon the activity of said selected ion in drilling fluid passing therethrough, and means for correlating the electromotive forces.

15. The combination of claim 14, wherein said first means and said second means each include an electrode that is reversible with respect to the selected ion.

16. The combination of claim 14, wherein said first means and said second means each include an electrode that is reversible with respect to the selected ion, and a reference electrode.

17. The combination of claim 14, and means for recording a third electromotive force of a magnitude dependent upon the differential between said first and said second electromotive forces.

18. The combination of claim 14, wherein said first means comprises a tubular casing electrically insulated from and constituting a part of the first-mentioned conduit means, means within and in contact with the casing for presenting a large surface area, and an electrode electrochemically reversible with respect to said selected ion defining the exposed surfaces of the last means and also the exposed inner surface of the casing.

References Cited in the file of this patent

UNITED STATES PATENTS

| | | |
|---|---|---|
| 1,720,325 | Hackstaff et al. | July 9, 1929 |
| 2,214,674 | Hayward | Sept. 10, 1940 |
| 2,230,999 | Doll | Feb. 11, 1941 |
| 2,289,687 | Stuart | July 14, 1942 |
| 2,328,555 | Hoover | Sept. 7, 1943 |
| 2,346,203 | Zaikowsky | Apr. 11, 1944 |
| 2,505,936 | Behn | May 2, 1950 |
| 2,517,382 | Brinker | Aug. 1, 1950 |
| 2,525,754 | Albrecht | Oct. 17, 1950 |
| 2,526,857 | Chaney | Oct. 24, 1950 |
| 2,659,046 | Arps | Nov. 10, 1953 |